United States Patent [19]
Baker

[11] 3,800,822
[45] Apr. 2, 1974

[54] WELL FLOW CONTROL VALVE

[75] Inventor: William J. Baker, Garden Grove, Calif.

[73] Assignee: Willis Oil Tool Co., Long Beach, Calif.

[22] Filed: Apr. 8, 1969

[21] Appl. No.: 816,161

Related U.S. Application Data

[63] Continuation of Ser. No. 540,355, April 5, 1966, abandoned.

[52] U.S. Cl.............. 137/489.5, 137/492, 137/495, 251/282, 137/458
[51] Int. Cl............................................. F16k 17/10
[58] Field of Search .......... 137/467, 510, 509, 458, 137/489.5, 492

[56] References Cited
UNITED STATES PATENTS

| | | | |
|---|---|---|---|
| 2,086,295 | 7/1937 | Erust.................................. | 137/509 |
| 2,528,440 | 10/1950 | Kmiecik............................. | 137/510 |
| 2,756,936 | 7/1956 | Mueller............................ | 137/510 X |
| 2,902,046 | 9/1959 | Dollison........................... | 137/467 |
| 3,043,331 | 7/1962 | Peters................................. | 137/458 |
| 3,077,898 | 2/1963 | Raymond........................... | 137/491 |
| 3,087,510 | 4/1963 | Normand.......................... | 137/509 |
| 3,092,136 | 6/1963 | Willis................................. | 137/458 |
| 3,223,114 | 12/1965 | Shafer................................ | 137/494 |

*Primary Examiner*—Harold W. Weakley
*Attorney, Agent, or Firm*—Paul A. Weilein

[57] ABSTRACT

Flow control valve means including a main valve in a main valve chamber operable by flow fluid pressure to open position, and a pilot valve in a pilot valve chamber operable by means of by-passed flow fluid pressure to an open position so as to admit fluid pressure to the valve chamber and close the main valve upon decrease or increase of the flow fluid pressure with respect to a predetermined pressure range. For such purpose, the pilot valve is provided with an actuator stem which is connectable through lost motion connections for movement in a pilot valve unseating direction either by an adjustable low pressure responsive spring, or by the action of high fluid pressure above an adjustable high pressure adjustable spring. The pilot valve head, when seated in closed position, presents equalizing effective pressure surfaces to the fluid in the pilot valve chamber so that the pilot valve head will be insensitive to fluid pressure changes in the pilot valve chamber, but when moved to open position by its actuating stem will be unbalanced and tend to remain in open position until again closed.

12 Claims, 7 Drawing Figures

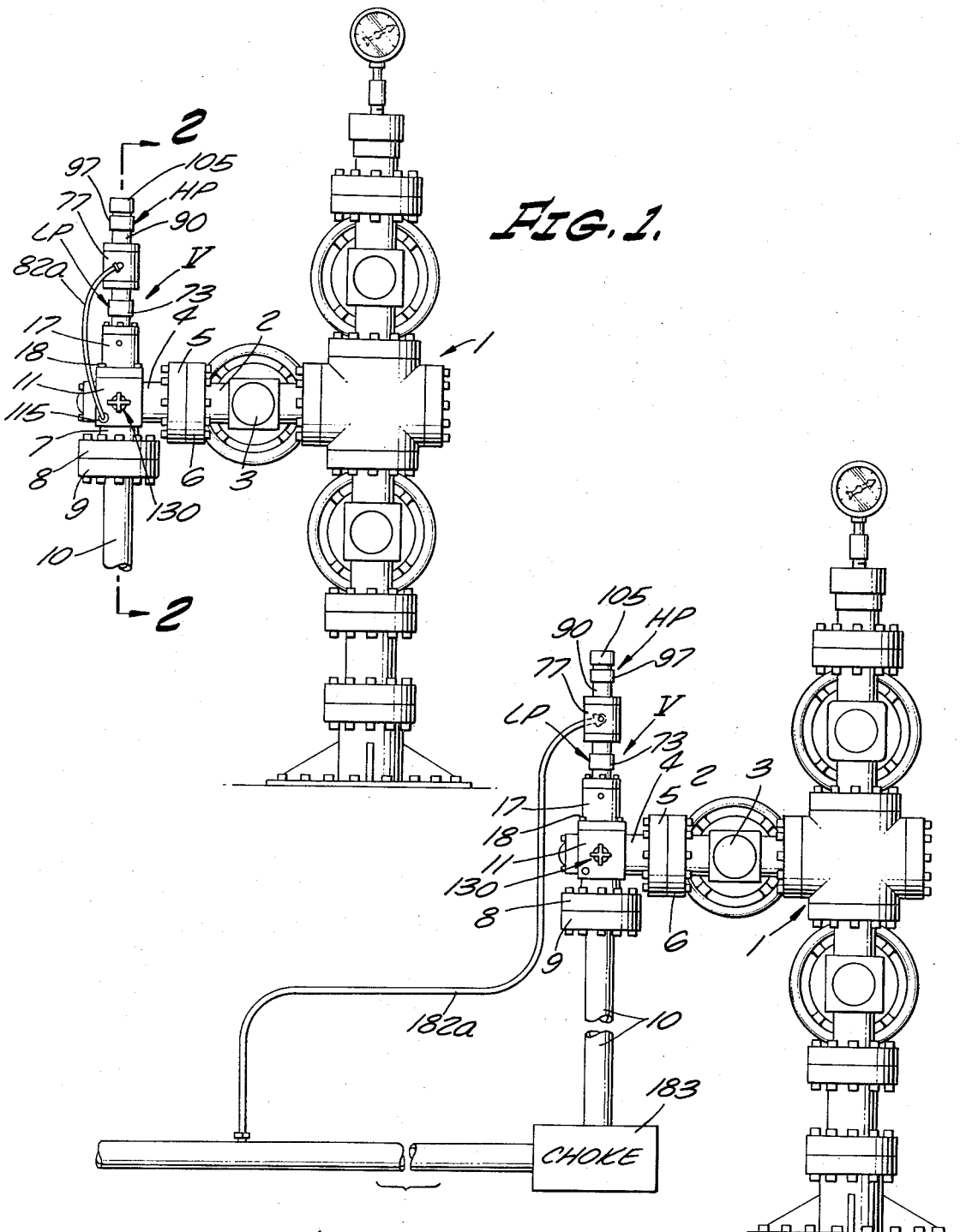

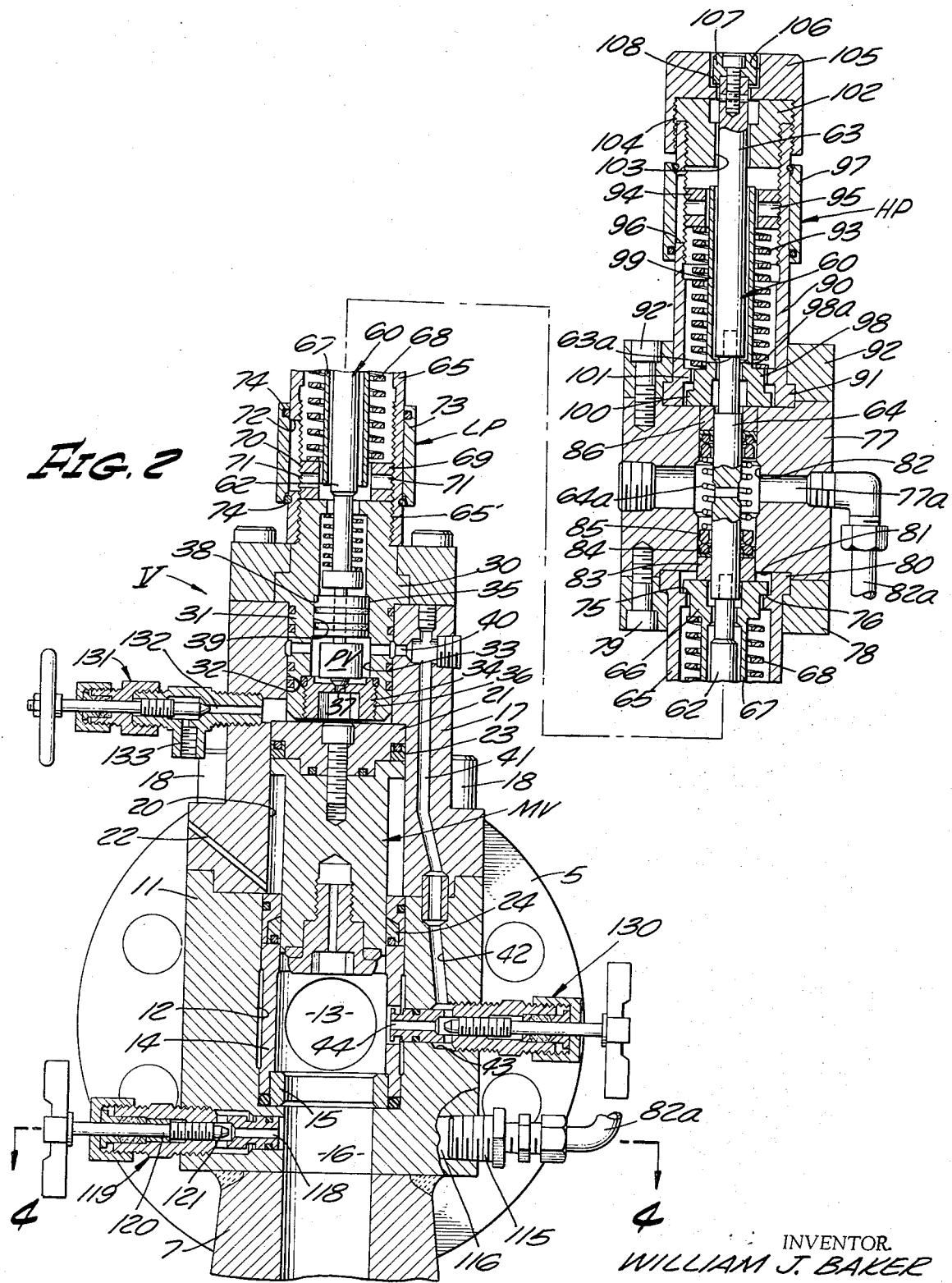

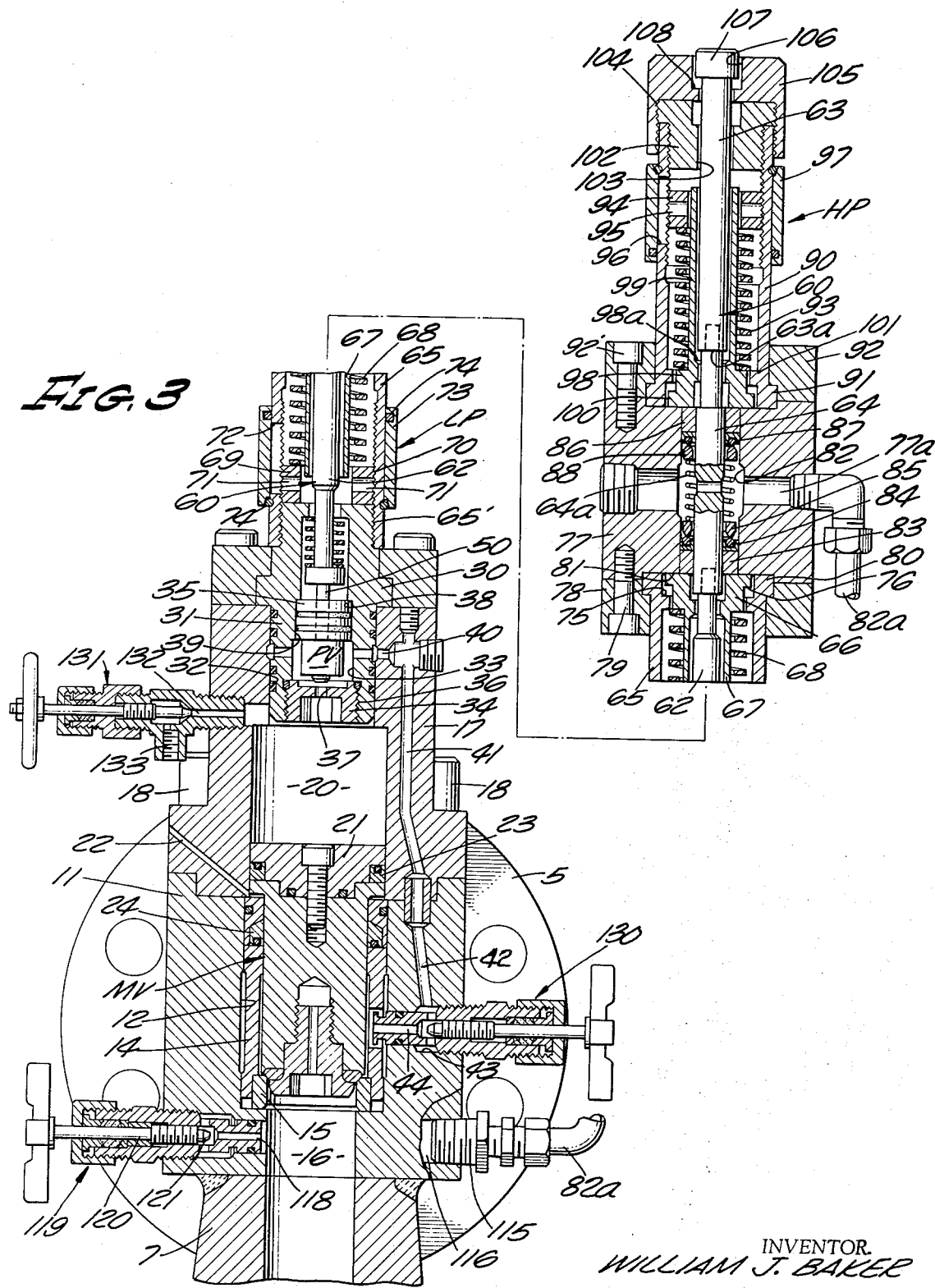

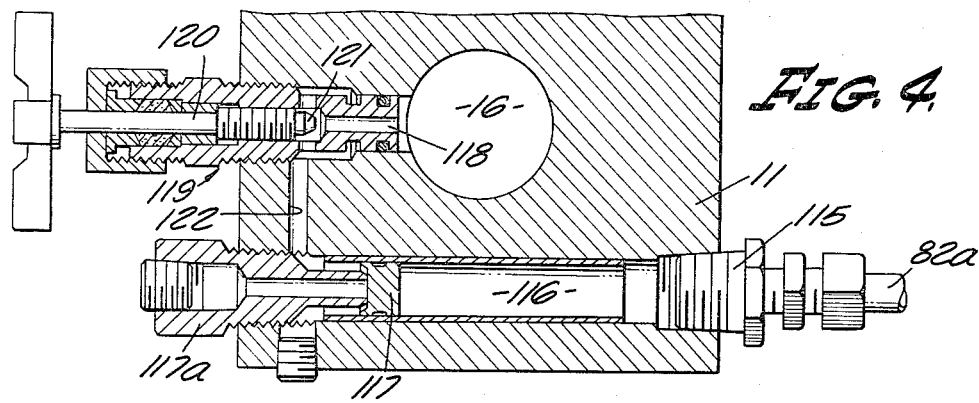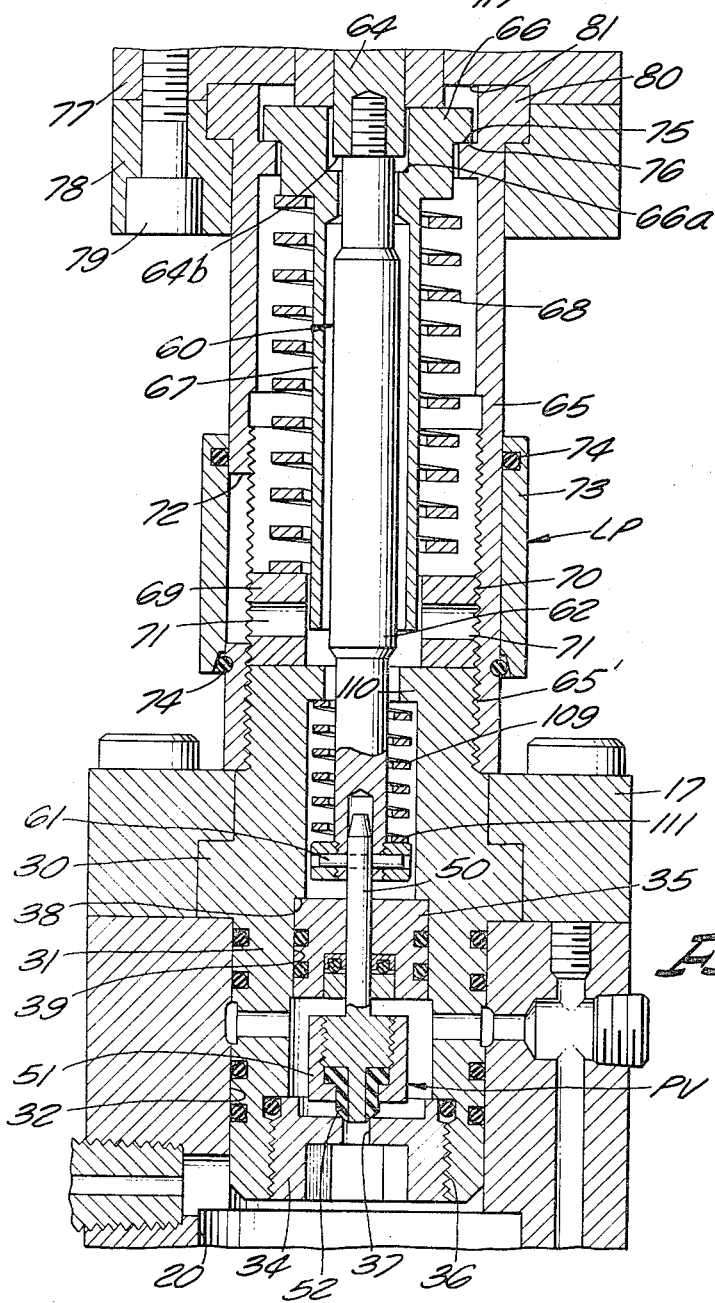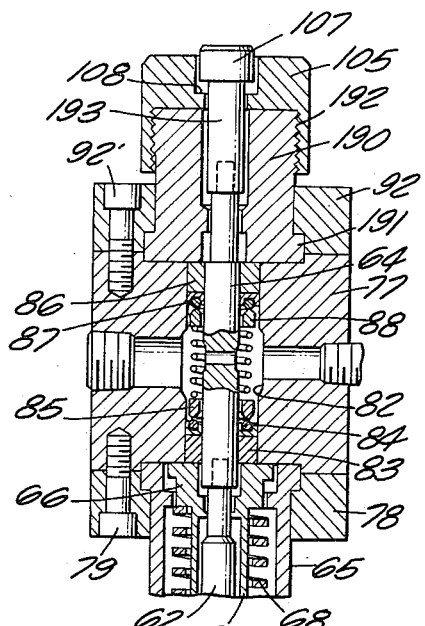

WELL FLOW CONTROL VALVE

This application is a continuation of my co-pending application Ser. No. 540,355, filed Apr. 5, 1966 and now abandoned.

The present invention relates to well flow control valves and more particularly to such valves wherein a fluid pressure operated main valve is under the control of a fluid pressure operated pilot valve, and the assembly is so constructed as to enable its installation at a producing well head or at such other location in the flow conduit leading from the well head as may be desired and will reliably operate to shut off the flow of well production fluids should pressure rise aobve or fall below a selected pressure range.

The present invention has as an object the provision of a fluid pressure operated main valve and fluid pressure operated pilot valve assembly which is so constructed as to be reliably operable without requiring supplemental pressure sources to effect valve actuation, such actuation being accomplished as a result of forces derived from the well production fluid pressure.

More specifically, an object of the invention is to provide a valve assembly as aforesaid which is insensitive to variations in the magnitude of the line pressure of any given well, the valve therefore being susceptible of assembly in the flow lines of a wide variety of wells producing fluid at a wide range of pressures.

In accomplishing the foregoing, it is another object of the invention to provide a fluid pressure operated pilot valve assembly which is adapted to control the application of fluid pressure to the main valve, wherein the pilot valve assembly head when closed is hydraulically balanced and thus is insensitive to the magnitude of the pressure of fluid controlled by the pilot valve, the pilot valve also being operable by fluid pressure operated actuator means so as to be moved off of its seat but then being unbalanced so as to remain off its seat until such time as the pressure conditions have been adjusted so that the pilot valve can again be seated.

In accomplishing the foregoing, moreover, another object of the invention is to provide a pilot valve head and actuator stem therefor which is not only hydraulically balanced when closed, but which is so related to the actuator means therefor that actuating forces derived from fluid pressure as well as the forces applied to the pilot valve after it has been unseated are not transmitted between the pilot valve itself and the actuator means therefor. In such a construction, the forces applied to the actuator means for unseating the pilot valve have no relation to forces acting on the pilot valve after it is unseated.

Still another object of the invention is to provide a fluid pressure operated main valve and pilot valve means therefor, which pilot valve means is adapted to respond either to a variation in a predetermined line pressure so as to cause opening of the pilot valve and consequential closing of the main valve, or to respond to manual operation. In pursuance of this objective, the pilot valve means may be responsive either to a predetermined rise or a predetermined drop in pressure and the pilot valve assembly is so constructed as to enable the utilization of either a high pressure pilot valve actuator or a low pressure pilot valve actuator or both a high pressure pilot valve actuator and a low pressure pilot valve actuator.

Other objects and advantages of the invention will be hereinafter described or will become apparent to those skilled in the art, and the novel features of the invention will be defined in the appended claims.

In the accompanying drawings:

FIG. 1 is a view illustrating a fluid pressure operated valve assembly in accordance with the invention as applied to a typical well head assembly;

FIG. 2 is an enlarged view in vertical section as taken on the line 2—2 of FIG. 1 through the valve assembly of the invention with certain of the parts shown in elevation and showing the main valve open and pilot valve closed;

FIG. 3 is a view corresponding to FIG. 2 but showing the main valve closed and the pilot valve open;

FIG. 4 is a view in transverse section as taken on the line 4—4 of FIG. 2;

FIG. 5 is a fragmentary sectional view on an enlarged scale showing the closed pilot valve and the related elements of the low pressure pilot valve actuator means;

FIG. 6 is a fragmentary view showing an assembly including only the low pressure responsive pilot valve actuator means and the manual pilot valve actuator means; and FIG. 7 is a view corresponding to FIG. 1 but showing the valve assembly of the invention controlled by a pressure sensing line downstream from a choke in the flow conduit leading from the well head.

Like reference characters in the several views of the drawings and in the following description designate corresponding parts.

Referring to FIG. 1, a conventional form of Christmas tree generally designated 1 is shown. Such a Christmas tree is employed at a well head to control and direct the flow of production fluid through a flow line 2 in which is a valve 3. Applied to the illustrative flow line 2 is a shut-off valve assembly generally designated V, having a supporting neck 4 with a mounting flange 5 secured to a mounting flange 6 of the flow line 2. The valve assembly V also includes a discharge neck 7 having a flange 8 secured to a flange 9 of a flow line 10. Accordingly, it will be observed that well fluids flowing through the Christmas tree 1 will pass through the valve assembly V and thence into flow line 10.

The valve assembly V comprises a central support block 11 to which the necks 4 and 7 are suitably affixed as by welding or the like. In the block 11 is a bore 12 into which leads an inlet passage 13 from the main fluid source. In the bore 12 is a liner 14 which is sealed in relation to the bore 12 at its ends and which defines within the bore 12 means for supporting a main valve MV whereby said main valve is adapted for reciprocation into engagement with and away from a valve seat member 15 which circumscribes the flow passage through the valve, the latter leading to an outlet passage 16 and thence to the flow line 10. Mounted above the block 11 is a body member 17 secured to the block 11 as by suitable fastenings 18, this member 17 having therein a main valve chamber 20 in which the enlarged head 21 of the main valve is reciprocable. Leading into the main valve chamber 20 beneath the enlarged head 21 is a passage 22 which vents the main valve chamber beneath the head 21 to atmosphere.

The main valve head 21 is provided with a suitable seal 23 to prevent communication between the main valve chamber 20 and the passage 22 and, in addition, suitable seal means 24 are provided between the reduced diameter section of the main valve MV and the liner 14 to prevent the passage of line pressure into the main valve chamber below the head 21.

The main valve construction as thus far described is essentially the same as that shown and described in the U.S. Pat. of R. S. Willis, No. 3,092,136, granted June 4, 1963. The present invention involves the provision of pilot valve means adapted for combination with the main valve assembly previously described so as to control the admission of high pressure fluid derived from the flow line to the main valve chamber 20, whereby the line pressure acting on the major area of the differential main valve MV will force the main valve to the closed position shown in FIG. 3 from the open position shown in FIG. 2.

The pilot valve means as herein specifically illustrated comprises a base member 30 having a tubular end section 31 adapted to fit in sealed relation within a bore 32 which communicates with the upper end of the main valve chamber 20. The end section 31 of base member 30 is provided internally with a pilot valve chamber 33, this chamber being defined between a seat member 34 and a pilot valve guide member 35.

The seat member 34 is suitably provided in the lower end of the end section 31 and is preferably in the form of a separate element engaged as by threads 36 with the end section 31 and providing a central opening 37 leading to the main valve chamber 20 from the pilot valve chamber 33, the member 34 thus providing a pilot valve seat at 37 circumscribing the passage between the pilot valve chamber and the main valve chamber. The pilot valve guide is also preferably in the form of a separate element seating against a shoulder 38 in a bore 39 in which suitable sealing means are provided between the member 35 and the base member 30.

Leading into the pilot valve chamber 33 through the end section 31 of base member 30 and through the body member 17 is a passageway 40 which is in communication with a passageway 41 in the body member 17 leading to a passageway 42 in the body block 11. This latter passage 42 communicates with a counterbore 43 and thence through a shut off valve passageway 44 with the main flow passage through the body block 11 so that line pressure at the inlet passage 13 is admitted to the passageways 44, 42, 41, and 40 so as to thus establish pressure communication between the main valve flow passage and the pilot valve chamber 33 when the main valve MV is either on its seat or off of its seat. Thus, the pressure of fluid at the main valve passage is to be employed as the motivating fluid pressure whereby to cause closure of the main valve.

The application of line fluid pressure to the main valve chamber 20 from the pilot valve chamber 33 is under the control of a pilot valve generally denoted PV. The pilot valve PV comprises a stem 50 which extends through the guide 35 and a head 51 disposed in the pilot valve chamber 33. Carried by the head 51 is a resilient head member 52 adapted for engagement with the pilot valve seat 37. In accordance with the objectives of the invention which involve the hydraulic balancing of the head 51 of the pilot valve PV, the pilot valve stem 50 and the pilot valve seat at 37 are of equal diameter and it will be noted that the head member 52 projects downwardly from the pilot valve for engagement with the seat, so that when the pilot valve PV is seated the same is fully hydraulically balanced in the pilot valve chamber 33 (see FIG. 5). Thus, when seated at 37, the pilot valve head 51 presents equal upper and lower effective pressure surfaces to the same pressure fluid, the valve head normally being clear of the cylinder walls and completely surrounded or circumambiently disposed (except as to the stem 50 and the seating member 52) in the same pressure fluid filling the pilot valve chamber 33. This is signified by the terms "balancing pilot valve " and the like.

Actuator means are provided for unseating the pilot valve PV and when the pilot valve is unseated it will be recognized that the same has differential areas subjected to pressure of fluid in pilot valve chamber 33, the difference being the cross sectional area of the stem 50 whereby the pilot valve upon being initially moved off its seat will then be pressure biased to a full open position (see FIG. 3).

Inasmuch as the pilot valve head 51 is balanced when closed, the magnitude of the force necessary to unseat the pilot valve PV is comparatively small. Therefore, as will hereinafter more fully appear, the actuator means for unseating the pilot valve need apply only a small force to the pilot valve stem 50 in an upward direction in order to unseat the pilot valve. The pilot valve actuator means includes low pressure actuator means LP and high pressure actuator means HP which are adapted to cooperate with the pilot valve actuator stem generally denoted at 60 which is affixed as at 61 to the pilot valve stem 50 and therefore constitutes an upward extension of the latter. The actuator stem 60 is, in the illustrative embodiment, composed of three sections, a low pressure actuator section 62, a high pressure actuator section 63, and an intermediate section 64.

Disposed about the stem section 62 is a housing or shell 65 which is threaded or otherwise suitably connected as at 65' to the base member 30. The actuator stem section 62 projects from the base member 30 upwardly into the housing 65 and is surrounded by an axially shiftable abutment member 66 having a skirt 67 extended downwardly within the housing 65 and defining with the latter an annular space in which is disposed a coiled compression spring 68. This spring is seated at its lower end on an adjustor collar 69 which is threadedly engaged as at 70 within the housing 65. The collar 69 has suitable openings 71 adapted to be engaged by a suitable tool for effecting rotation of the collar, and the housing 65 has an access opening 72 to allow insertion of the tool into the collar openings, whereby to effect such adjustment. A closure sleeve 73 is disposed about the housing 65 and is shiftable thereon between positions at which the access opening 72 is uncovered and covered. Suitable sealing means as indicated at 74 are provided for precluding the entry of dust or the like into the actuator housing 65 through access opening 72.

Spring 68 at its upper end engages the abutment member 66 so as to bias the same upwardly. Downward movement of the abutment member 66 is limited by means of a shoulder 75 on the latter which is in opposed relation to a shoulder 76 formed internally of the housing 65.

A cylinder block 77 is mounted at the upper end of the housing 65, being secured to the latter by a flange 78 and suitable fastenings 79, the flange and the cylinder block 77 being formed to accommodate an outwardly extended flange 80 on the housing 65. It will be noted that the abutment member 66 is limited in the extent of its upward travel by engagement with the lower surface 81 of the cylinder block 77.

Formed in the cylinder block 77 is a cylinder or chamber 82 in which the intermediate actuator stem section 64 is concentrically disposed. The stem 64 defines with the wall of the cylinder 82 a lower annular space in which is disposed a push ring 83, a seal ring 84, and a seal expander ring 85. At the upper end of the cylinder 82 another annular space is defined in which are disposed an upper pusher ring 86, a seal ring 87, and a seal expander 88. The expander rings 85 and 88 are preferably biased into engagement with the respective seal rings 84 and 87 by an expansible spring 64a disposed about the actuator stem section 64.

At the top of the cylinder block 77 is a high pressure pilot valve actuator housing 90 which will be observed to be in the illustrative embodiment a replica of the housing 65 turned end for end and having a flange 91 at its lower end clamped against the upper end of the cylinder block 77 by a flange 92 held in place by suitable fastenings 92'. The high pressure pilot valve actuator stem section 63 is disposed within the housing 90 and also within the housing 90 is a coiled spring 93 which seats at its upper end on an adjustor collar 94 having openings 95 for reception of a tool inserted through the housing opening 96 when the sealing sleeve 97 is shifted from the position closing the access opening 96 to a position at which said opening is uncovered.

At its lower end the spring 93 abuts with an abutment member 98 having a skirt 99 which, like the skirt 67 of abutment member 66 previously described, defines with the housing an annular space in which the spring is disposed. Abutment member 98 is adapted to abut with the upper end surface of the cylinder block 77 under the force supplied by spring 93. Upward movement of the abutment member 98 is limited by a shoulder 100 on the abutment member 98 and an opposing shoulder 101 formed internally of the housing 90.

Within the upper end of the housing 90 is a plug 102 having an opening 103 through which the actuator stem section 63 projects. Threadedly engaged as at 104 with the plug 102 is an actuator cap 105 having a bore 106 for the reception of an end abutment member 107 provided on the outer extremity of the stem section 63. Actuator cap 105 has an internal shoulder 108 adapted for engagement with the member 107 upon threaded movement of the cap 105, by means of which an upward motion may be imparted to the actuator stem 60.

It will now be apparent that when the main valve is open and the pilot valve is closed as shown in FIGS. 2 and 5, the head 51 of the pilot valve PW being hydraulically balanced may be easily held on its seat by means of a coiled compression spring 109 which is disposed within a bore in the base member 30 in abutting engagement with an inwardly extended end flange 110 and abutting at its lower end with a shoulder 111 suitably provided on the means for effecting intercommunication between the pilot valve stem 50 and the actuator stem section 62.

Means in the nature of a lost motion connection are provided whereby the pilot valve actuator stem may be moved upwardly by the abutment member 66 or by the abutment member 98, such means normally being disconnected. To this end, abutment member 66 of the low pressure pilot actuator is provided, as best seen in FIG. 5, with an internal shoulder 66a which is opposed to a shoulder 64b on the pilot valve actuator stem 60. This shoulder 64b may conveniently be provided as the lower extremity of the intermediate actuator rod stem section 64 at the point of interconnection with the stem section 62. Similarly, abutment member 98 of the high pressure pilot valve actuator assembly is, as best seen in FIG. 2, provided with an internal shoulder 98a which is in opposed relation to a shoulder 63a on the pilot valve actuator stem 60. This shoulder 63a may be provided conveniently at the lower extremity of the rod section 63 at the point of interconnection with the intermediate stem section 64. The respective abutment members 66 and 98 and the shoulders 66a and 98a thereon, together with the opposing stem shoulders 64a and 63a are adapted to cause actuation of the pilot valve stem actuator stem 60 in an upward direction to unseat the pilot valve PV if the pressure in the cylinder 82 of cylinder block 77 either drops below or exceeds a value productive of a force acting downwardly against spring 68 or upwardly against spring 93, respectively, less than or greater than the force in the opposite direction as may be controlled by adjustment of these respective springs.

In accordance with the embodiment of the invention thus far described, fluid pressure is supplied to the cylinder 82 through a conduit 82a connected to the cylinder block 77 and communicating with a passage 77a in the latter which leads to the cylinder 82. Referring to FIG. 4, it will be noted that the conduit 82a leads to a fitting 115 mounted in the valve body block 11 to one side of the latter. This fitting 115 provides for communication between the conduit 82a and a chamber 116 within block 11. This chamber is provided with a divider piston 117 so that clean operating fluid may be employed to fill the pilot valve actuator cylinder 82, conduit 82a, and chamber 116, while line fluid is employed to actuate the piston 117 to pressurize the clean fluid. In this connection, leading from the outlet passage 16 of the block 11 is a passage 118 formed in a shut off valve assembly 119, the latter being threadedly engaged in the body and having a stem 120 and a head 121 adapted when seated to shut off the communication from the outlet passage 16 through passage 118, but when open being adapted to allow communication between the outlet passage 16 through a passage 122 in block 11 and the chamber 116, so that the pressure from the outlet passage 16 of the valve is applied to the divider piston 117 and such pressure, as a consequence, is applied to the cylinder 82 of the cylinder block 77. A stop plug 117a is preferably provided in body 111 to limit movement of piston 117 in the absence of pressure from outlet 16.

Operation of the pressure responsive actuator means is as follows. Assuming that the magnitude of the pressure in cylinder 82 is within the desired range, the pressure will be sufficiently great as to apply a force to the abutment member 66 of the low pressure pilot valve actuator through the pusher 83 so as to hold the shoulder 75 on the abutment member 66 against the shoulder 76 of the housing 65, as shown in FIG. 2 and on an enlarged scale in FIG. 5. At the same time, this pressure would not be sufficiently great as to apply a force against abutment member 98 through the pusher 86 as to move the abutment member 98 away from the upper end surface of the cylinder bock 77 (see FIG. 2).

Referring now to FIGS. 3 and 3, the main valve MV is shown in a closed condition resulting from the pilot valve PV being in an open condition. Under these circumstances, it will be noted that the main valve chamber 20 is in communication with the inlet side of the valve body through passageways 44, 42, 41, 40 and the pilot valve chamber 33 and, therefore, the inlet pressure acting on the enlarged end 21 of the main valve piston has moved the main valve to the closed position. In the illustration of FIG. 3, the main valve is shown as closed, say, as a result of the pressure in the flow passage through the valve having been reduced to such an extent that the force applied by the low pressure pilot valve spring 68 to the abutment member 66 in an upward direction exceeded the force applied to the abutment member 66 in a downward direction by the pusher 83, which latter force is a function of pressure in the cylinder 82 of the cylinder block 77.

Referring to FIGS. 2 and 5, it will be noted that when the pilot valve PV is closed, the abutment member 66 at the shoulder 66a is spaced from the shoulder 64a of actuator stem section 64 a distance less than the permissible travel of the abutment member 66 in an upward direction. Therefore, the shoulder 66a in moving upwardly as pressure drops in the cylinder 82 will engage the shoulder 64a to apply a force greater than the force applied downwardly by spring 109, which tends to hold the pilot valve PV on its seat. In a practical application of the present structure, it will be appreciated that the value of spring 109 would preferably be selected so that it will be negligible in respect of the upward force applied by the low pressure pilot actuated spring 68, but in any event, the hereinabove described means for adjusting the loading on the pilot valve spring 68 may be employed to so adjust the force of spring 68 that the opposing force of spring 109 will be negligible.

After the pilot valve PV has been initially moved off of its seat so that the valve PV is unbalanced, fluid pressure within the pilot valve chamber 33 will continue the opening movement of the pilot valve until the head 51 is in abutting engagement with the guide 35 as shown in FIG. 3. Thereafter, the abutment member 66 may continue to move upwardly under the influence of spring 68 until it abuts with the lower surface 81 of cylinder block 77. In other words, the permissible upward travel of the pilot valve actuator stem is preferably greater than the permissible upward movement of the abutment member 66 so that following initial contact of shoulders 66a and 64a whereby the pilot valve is kicked, so to speak, off of its seat, the remaining free movement of the pilot valve actuator stem is greater than the remaining travel upwardly of the abutment member 66. Thus, it will be apparent that when the pilot valve is closed as well as when the pilot valve is opened, it is not effected in any way by the magnitude of the pressures either in the pilot valve actuator cylinder 82 or by the spring force employed to kick the pilot valve off of its seat.

Likewise, the high pressure pilot valve actuator means is constructed in the same manner as the low pressure pilot valve actuator means. Thus, in the event that pressure in the cylinder 82, as seen in FIG. 2, should rise so as to move the abutment member 98 upwardly, the shoulder 98a thereon will engage the shoulder 63a of the upper pilot valve actuator stem section 63 to kick the pilot valve PV off of its seat, and thereafter the permissible upward travel of the pilot valve stem will exceed the remaining permissible upward travel of the abutment member 98 which is limited by the opposing shoulders 100 and 101, respectively, on the abutment member and the high pressure pilot valve housing 90.

A third manner in which the pilot valve stem may be moved upwardly to effect initial unseating of the pilot valve PV, as pointed out above, is constituted by the threaded cap 105.

After the main valve MV is closed as a result of line pressure being applied to the main valve in the main valve chamber 20 and it is desired to reopen the valve, it is necessary that such line pressure be shut off from communication with the main valve chamber and that the main valve chamber be vented. Accordingly, a shut off valve generally denoted at 130 is provided for shutting off the communication between the passageway 42 in valve body block 11 and the passageway 44 leading into the flow passage through the valve body, and vent valve means 131 are provided in the valve body and more particularly in the body member 17 for venting the main valve chamber 20. As best seen in FIGS. 2 and 3, the vent valve means 131 includes a passageway 132 leading into the main valve chamber, and adapted to communicate with a vent passage 133 which may vent either freely to atmosphere as shown, or into some suitable receptacle in the event that it is desired to retain the vented fluid.

In accordance with the objectives of the invention, the structure is adaptable to various modes of usage which may involve the use solely of a low pressure pilot valve. Accordingly, as shown in FIG. 6, in lieu of mounting the high pressure pilot valve housing 90 on the cylinder block 77, a guide member 190 having a flange 191 thereon may be clamped to the cylinder block 77 by the flange 92. In this embodiment the guide 190 is threaded as at 192 to accommodate the manually operable cap 105 which is identical to the cap shown on the valve assembly of FIGS. 1–5. In FIG. 6, in addition, a short pilot valve actuator stem section 193 is connected to the actuator stem section 64 is provided at its upper end with the abutment member 107 as in the previously described structure. Thus, in the structure shown in FIG. 6, the pilot valve will be moved off its seat either responsive to a predetermined drop in pressure in the cylinder 82, or in response to manual operation.

Also in accordance with the objectives of the invention, the pilot valve actuator means may be adapted for response to a change in pressure at a location remote from the well head and, as shown in FIG. 7, the pressure sensing line is designated 182a and instead of leading to the cylinder block 77 from valve body 11 as does the pressure line 82a of FIG. 1, the pressure line 182a of FIG. 7 extends to the cylinder block 77 from the flow line in downstream relation to a choke designated 183. In this event the valve 121 will be closed to prevent communication between chamber 116 and pressure at the discharge passage 16. As is well known in the art, the choke 183 will be employed to reduce the flow line pressure downstream of the valve assembly. The advantage of sensing the flow line pressure downstream of the choke if desired in some well production facilities, is that the valve of the present invention provides means for protecting the well against loss of valuable production fluids in the event that a flow line should rupture or acquire a leak downstream of the choke or in the event of some restriction to flow downstream of the choke, the valve will be closed until such restriction has been removed.

It will also be obvious that the pressure sensing line 182a may be connected to the stop plug 117a so that the closed pilot pressure system including the chamber 116, piston 117, and line 82a may be employed. In the latter event, the valve 121 will also be closed to eliminate communication between the chamber 116 and pressure at the discharge passage 16 of the main valve.

While specific structural details have been shown and described, it should be understood that changes and alterations may be resorted to without departing from the spirit of the invention.

I claim:

1. A fluid pressure operated valve assembly, comprising: a valve body having a flow passage therethrough; a main valve chamber; a main valve having a portion disposed in said main valve chamber; a passageway leading from said flow passage to said main valve chamber; pilot valve means for controlling the admission of fluid under pressure from said flow passage through said passageway to said main valve chamber; said pilot valve means including a pilot valve chamber defining a portion of said passageway; an opening between said pilot valve chamber and said main valve chamber; a pilot valve seat circumscribing said opening; a pilot valve in said pilot valve chamber; means supporting said pilot valve for movement into and out of engagement with said seat including a valve stem extending from said pilot valve chamber opposite said pilot valve seat; said stem having the same cross sectional area as said seat; said pilot valve in seated position presenting equal opposed pressure active areas in balanced relation, and in unseated position exposing the seat area to effect an unbalancing of the pressure active areas in a valve opening direction; and means for actuating said stem for moving said pilot valve off of said seat, said fluid pressure operated means including means respectively responsive to an increase and to a decrease in said control fluid pressure each arranged to initiate movement of said pilot valve off of said seat.

2. A fluid pressure operated valve assembly, comprising: a valve body having a flow passage therethrough; a main valve chamber; a main valve having a portion disposed in said main valve chamber; a passageway leading from said flow passage to said main valve chamber; pilot valve means for controlling the admission of fluid under pressure from said flow passage through said passageway to said main valve chamber; said pilot valve means including a pilot valve chamber defining a portion of said passageway; an opening between said pilot valve chamber and said main valve chamber; a pilot valve seat circumscribing said opening; a pilot valve in said pilot valve chamber; means supporting said pilot valve for movement into and out of engagement with said seat including a valve stem extending from said pilot valve chamber opposite said pilot valve seat; said stem having the same cross sectional area as said seat; said pilot valve in seated position presenting equal opposed pressure active areas in balanced relation, and in unseated position exposing the seat area to effect an unbalancing of the pressure active areas in a valve opening direction; and means for actuating said stem for moving said pilot valve off of said seat, said fluid pressure operated means including means responsive to a decrease in said control fluid pressure; and including manual actuator means; and lost-motion means connecting said manual actuator means to said valve stem.

3. A fluid pressure operated valve assembly, comprising: a valve body having a flow passage therethrough; a main valve chamber; a main valve having a portion disposed in said main valve chamber; a passageway leading from said flow passage to said main valve chamber; pilot valve means for controlling the admission of fluid under pressure from said flow passage through said passageway to said main valve chamber; said pilot valve means including a pilot valve chamber defining a portion of said passageway; an opening between said pilot valve chamber and said main valve chamber; a pilot valve seat circumscribing said opening; a pilot valve in said pilot valve chamber; means supporting said pilot valve for movement into and out of engagement with said seat including a valve stem extending from said pilot valve chamber opposite said pilot valve seat; said stem having the same cross sectional area as said seat; said pilot valve in seated position presenting equal opposed pressure active areas in balanced relation, and in unseated position exposing the seat area to effect an unbalancing of the pressure active areas in a valve opening direction; and means for actuating said stem for moving said pilot valve off of said seat, said means for actuating said valve stem comprising an actuator stem projecting from said pilot valve stem; means defining a control fluid chamber; means for conducting control fluid to said chamber; means operable responsive to the pressure of fluid in said chamber for shifting said actuator stem in a direction to move said pilot valve off of said seat including a pair of abutment members disposed about said actuator stem; means for normally forcing said abutment members toward one another; and piston means operable responsive to the pressure of fluid in said control chamber for urging said abutment members away from one another.

4. A fluid pressure operated valve assembly, comprising: a valve body having a flow passage therethrough a main valve chamber; a main valve having a portion disposed in said main valve chamber; a passageway leading from said flow passage to said main valve chamber; pilot valve means for controlling the admission of fluid under pressure from said flow passage through said passageway to said main valve chamber; said pilot valve means including a pilot valve chamber defining a portion of said passageway; an opening between said pilot valve chamber and said main valve chamber; a pilot valve seat circumscribing said opening; a pilot valve in said pilot valve chamber; means supporting said pilot valve for movement into and out of engagement with said seat including a valve stem extending from said pilot valve chamber opposite said pilot valve seat; said stem having the same cross sectional area as said seat; said pilot valve in seated position presenting equal opposed pressure active areas in balanced relation, and in unseated position exposing the seat area to effect an unbalancing of the pressure active areas in a valve opening direction; and means for actuating said stem for moving said pilot valve off of said seat, said means for actuating said valve stem comprising an actuator stem projecting from said pilot valve stem; means defining a control fluid chamber; means for conducting control fluid to said chamber; means operable response to the pressure of fluid in said chamber for shifting said actuator stem in a direction to move said pilot valve off of said seat including a pair of abutment members freely disposed about said actuator stem; means for forcing said abutment members towards one another; and piston means operable responsive to the pressure of fluid in said control chamber for urging said abutment members away from one another; said actuator stem and said abutment members having opposing shoulders engageable with one another upon movement of either of said abutment members in one direction relative to said actuator stem to cause engagement of said shoulders.

5. A fluid pressure operated valve assembly, comprising: a valve body having a flow passage therethrough; a main valve chamber; a main valve having a portion disposed in said main valve chamber; a passageway leading from said flow passage to said main valve chamber; pilot valve means for controlling the admission of fluid under pressure from said flow passage through said passageway to said main valve chamber; said pilot valve means including a pilot valve chamber defining a portion of said passageway; an opening between said pilot valve chamber and said main valve chamber; a pilot valve seat circumscribing said opening; a pilot valve in said pilot valve chamber; means supporting said pilot valve for movement into and out of engagement with said seat including a valve stem extending from said pilot valve chamber opposite said pilot valve seat; said stem having the same cross sectional area as said seat; said pilot valve in seated position presenting equal opposed pressure active areas in balanced relation, and in unseated position exposing the seat area to effect an unbalancing of the pressure active areas in a valve opening direction; and means for actuating said stem for moving said pilot valve off of said seat, said means for actuating said valve stem comprising fluid pressure operated means responsive to variation in the pressure of control fluid above and below predetermined limits; means for conducting control fluid to said actuator means; and means for adjusting the respective high and low limits of control fluid pressure response of said actuator means.

6. A pilot valve for controlling the admission of pressure fluid to a main valve actuator chamber, comprising: a pilot valve body having a chamber therein; a pressure fluid inlet leading into said chamber; an outlet leading from said chamber; a seat circumscribing said outlet; a pilot valve head in said chamber; a stem on said head projecting from said chamber defining a portion of said passageway; said stem and said seat being of equal cross sectional areas; said head having equal opposed areas exposed to fluid pressure in said chamber when said head is engaged with said seat and a greater area exposed to fluid pressure in said chamber, when said head is off of said seat, operative to hold said head off of said seat; and actuator means for moving said stem to shift said head off of said seat; said actuator means comprising fluid pressure operated means; means for conducting control fluid pressure to said fluid pressure operated means; and lost-motion means connecting said actuating means to said stem whereby said stem may continue to move with said pilot valve, in valve opening direction without further movement of said fluid pressure operated means, said fluid pressure operated means including means respectively responsive to an increase and to a decrease in said control fluid pressure each arranged to initiate movement of said pilot valve off of said seat.

7. A pilot valve for controlling the admission of pressure fluid to a main valve actuator chamber, comprising: a pilot valve body having a chamber therein; a pressure fluid inlet leading into said chamber; an outlet leading from said chamber; a seat circumscribing said outlet; a pilot valve head in said chamber; a stem on said head projecting from said chamber defining a portion of said passageway; said stem and said seat being of equal cross sectional areas; said head having equal opposed areas exposed to fluid pressure in said chamber when said head is engaged with said seat and a greater area exposed to fluid pressure in said chamber, when said head is off of said seat, operative to hold said head off of said seat; and actuator means for moving said stem to shift said head off of said seat; said actuator means comprising fluid pressure operated means; means for conducting control fluid pressure to said fluid pressure operated means; and lost-motion means connecting said actuating means to said stem whereby said stem may continue to move with said pilot valve, in valve opening direction without further movement of said fluid pressure operated means, said fluid pressure operated means including means responsive to a decrease in said control fluid pressure; and including manual actuator means and lost-motion means connecting said manual actuator means to said stem.

8. A pilot valve for controlling the admission of pressure fluid to a main valve actuator chamber, comprising: a pilot valve body having a chamber therein; a pressure fluid inlet leading into said chamber; an outlet leading from said chamber; a seat circumscribing said outlet; a pilot valve head in said chamber; a stem on said head projecting from said chamber defining a portion of said passageway; said stem and said seat being of equal cross sectional areas; said head having equal opposed areas exposed to fluid pressure in said chamber when said head is engaged with said seat and a greater area exposed to fluid pressure in said chamber, when said head is off of said seat, operative to hold said head off of said seat; and actuator means for moving said stem to shift said head off of said seat; said actuator means comprising fluid pressure operated means; means for conducting control fluid pressure to said fluid pressure operated means; and lost-motion means connecting said actuating means to said stem whereby said stem may continue to move with said pilot valve, in valve opening direction without further movement of said fluid pressure operated means, said means for actuating said valve stem comprising an actuator stem projecting from said pilot valve stem; means defining a control fluid chamber; means for conducting control fluid to said chamber; means operable responsive to the pressure of fluid in said chamber for shifting said actuator stem in a direction to move said pilot valve off of said seat including a pair of abutment members disposed about said actuator stem; means for normally forcing said abutment members towards one another; and piston means operable responsive to the pressure of fluid in said control chamber for urging said abutment members away from one another.

9. A pilot valve for controlling the admission of pressure fluid to a main valve actuator chamber, comprising: a pilot valve body having a chamber therein; a pressure fluid inlet leading into said chamber; an outlet leading from said chamber; a seat circumscribing said outlet; a pilot valve head in said chamber; a stem on said head projecting from said chamber; said stem and said seat being of equal cross sectional areas; said head having equal opposed areas exposed to fluid pressure in said chamber when said head is engaged with said seat and a greater area exposed to fluid pressure in said chamber, when said head is off of said seat, operative in a direction to hold said head off of said seat; and actuator means for moving said stem to shift said head off of said seat; said means for actuating said valve stem comprising an actuator stem projecting from said pilot valve stem; means defining a control fluid chamber; means for conducting control fluid to said chamber; means operable responsive to the pressure of fluid in said chamber for shifting said actuator stem in a direction to move said pilot valve off of said seat including a pair of abutment members freely disposed about said actuator stem; means for forcing said abutment members towards one another; and piston means operable responsive to the pressure of fluid in said control chamber for urging said abutment members away from one another; said actuator stem and said abutment members having opposing shoulders engageable with one another upon movement of either of said abutment members in one direction relative to said actuator stem to cause engagement of said shoulders.

10. A pilot valve for controlling the admission of pressure fluid to a main valve actuator chamber, comprising: a pilot valve body having a chamber therein; a pressure fluid inlet leading into said chamber; an outlet leading from said chamber; a seat circumscribing said outlet; a pilot valve head in said chamber; a stem on said head projecting from said chamber defining a portion of said passageway; said stem and said seat being of equal cross sectional areas; said head having equal opposed areas exposed to fluid pressure in said chamber when said head is engaged with said seat and a greater area exposed to fluid pressure in said chamber, when said head is off of said seat, operative to hold said head off of said seat; and actuator means for moving said stem to shift said head off of said seat; said actuator means comprising fluid pressure operated means; means for conducting control fluid pressure to said fluid pressure operated means; and lost-motion means connecting said actuating means to said stem whereby said stem may continue to move with said pilot valve, in valve opening direction without further movement of said fluid pressure operated means, said fluid pressure operated means being responsive to variation in the pressure of control fluid above and below predetermined limits; means for conducting control fluid to said actuator means; and means for adjusting the respective high and low limits of control fluid pressure response of said actuator means.

11. A fluid pressure operated valve assembly, comprising: a valve body having a flow passage therethrough; a main valve chamber; a main valve having a portion disposed in said main valve chamber; a passageway leading from said flow passage to said main valve chamber; pilot valve means for controlling the admission of fluid under pressure from said flow passage through said passageway to said main valve chamber; said pilot valve means including a pilot valve chamber defining a portion of said passageway; an opening between said pilot valve chamber and said main valve chamber; a pilot valve seat circumscribing said opening; a pilot valve in said pilot valve chamber; means supporting said pilot valve for movement into and out of engagement with said seat including a valve stem extending from said pilot valve chamber opposite said pilot valve seat; said stem having the same cross sectional area as said seat; means for actuating said stem for moving said pilot valve off of said seat; said means for actuating said stem comprising fluid pressure operated means and means for conducting control fluid pressure to said fluid pressure operated means including a conduit having a chamber provided with a divider piston therein; hydraulic fluid filling said conduit and filling said fluid pressure operated means at one side of said divider piston; and means for conducting control fluid pressure to the other side of said divider piston.

12. A fluid pressure operated valve assembly comprising: a valve body having a flow passage therethrough; a main valve chamber; a main valve having a portion disposed in said main valve chamber; a passageway leading from said flow passage to said main valve chamber including a pilot valve chamber having a seat forming opening communicating with the main valve chamber; a pilot valve in the pilot valve chamber; a stem extending from said pilot valve chamber opposite said seat forming opening, and supporting said pilot valve for movement into and out of engagement with said seat, said stem having the same cross sectional area as said seat, said pilot valve having hydraulically balanced opposed pressure active areas when seated and opposed pressure active areas hydraulically unbalanced in an opening direction when unseated; and actuating means coupled with said stem including fluid pressure responsive means operable to unseat said pilot valve respectively upon occurrence of a predetermined high value of said fluid pressure, and a predetermined low value of said fluid pressure.

* * * * *